US012681479B2

(12) United States Patent
Araújo et al.

(10) Patent No.: US 12,681,479 B2
(45) Date of Patent: Jul. 14, 2026

(54) DETERMINING CONTROL PARAMETERS FOR FORMATION OF MULTIPLE UAVs

(71) Applicant: Telefonaktiebolaget LM Ericsson (publ), Stockholm (SE)

(72) Inventors: José Araújo, Stockholm (SE); Diego Gonzalez Morin, Galapagar (ES); Soma Tayamon, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 495 days.

(21) Appl. No.: 16/973,758

(22) PCT Filed: Jun. 10, 2019

(86) PCT No.: PCT/EP2019/065064
§ 371 (c)(1),
(2) Date: Dec. 9, 2020

(87) PCT Pub. No.: WO2019/238596
PCT Pub. Date: Dec. 19, 2019

(65) Prior Publication Data
US 2021/0255644 A1      Aug. 19, 2021

Related U.S. Application Data

(60) Provisional application No. 62/683,588, filed on Jun. 11, 2018.

(51) Int. Cl.
G05D 1/00 (2024.01)
B64U 10/14 (2023.01)
B64U 101/30 (2023.01)

(52) U.S. Cl.
CPC ........... G05D 1/104 (2013.01); G05D 1/0274 (2013.01); G05D 1/0858 (2013.01); B64U 10/14 (2023.01);
(Continued)

(58) Field of Classification Search
CPC .... G05D 1/104; G05D 1/0274; G05D 1/0858; B64C 39/024; B64U 2201/102; B64U 2102/30
See application file for complete search history.

(56) References Cited

U.S. PATENT DOCUMENTS 9,079,662 B1      7/2015  Duffy et al.
9,126,693 B1 *    9/2015  Shi ....................... G05D 1/0669
(Continued)

FOREIGN PATENT DOCUMENTS

CN          104812671 A      7/2015
CN          206537510 U      10/2017
(Continued)

OTHER PUBLICATIONS

Benmoussa, Amine, and Pedro Vieira Gamboa. "Effect of Control Parameters on Hybrid Electric Propulsion UAV Performance for Various Flight Conditions: Parametric Study." MDPI, Multidisciplinary Digital Publishing Institute, Apr. 25, 2023, www.mdpi.com/2673-3161/4/2/28. (Year: 2023).*
(Continued)

*Primary Examiner* — Andrew J Cromer
(74) *Attorney, Agent, or Firm* — Sage Patent Group

(57) ABSTRACT

According to a first aspect, it is provided a method for determining control parameters for controlling flight of a formation comprising at least two physically connected UAVs. The method is performed in a controller device and comprising the steps of: determining UAVs forming part of the formation; controlling each one of the UAVs, in sequence, to perform a lift off procedure in which the UAV lifts off ground and lands on ground; acquiring, for each lift off procedure, inertial data from Inertial Measurement Units, IMUs, of each one of the UAVs of the formation; estimating UAV connection parameters for each possible pair of UAVs of the formation based on the inertial data, the UAV con-
(Continued)

nection parameter comprising at least one of relative orientation, absolute orientations and distance between the UAVs of the pair; and determining control parameters for controlling flight of the formation based on the estimated connection parameters.

24 Claims, 3 Drawing Sheets

(52) U.S. Cl.
CPC .... *B64U 2101/30* (2023.01); *B64U 2201/102* (2023.01)

(56) References Cited

U.S. PATENT DOCUMENTS

| | | | |
|---|---|---|---|
| 2010/0308174 A1 | 12/2010 | Calverley | |
| 2014/0025238 A1 | 1/2014 | So et al. | |
| 2014/0027564 A1* | 1/2014 | Mercer | B64C 13/18 |
| | | | 244/17.13 |
| 2014/0374532 A1 | 12/2014 | Duffy et al. | |
| 2015/0120126 A1 | 4/2015 | So et al. | |
| 2015/0266575 A1* | 9/2015 | Borko | B64U 10/10 |
| | | | 244/17.23 |
| 2016/0123182 A1 | 5/2016 | Samaritano et al. | |
| 2016/0144958 A1* | 5/2016 | Woodworth | G05D 1/0866 |
| | | | 244/139 |
| 2017/0291704 A1* | 10/2017 | Alegria | G01S 15/02 |
| 2018/0340774 A1* | 11/2018 | Rastegar | G01S 5/0247 |
| 2019/0155678 A1* | 5/2019 | Hsiong | G06F 11/0793 |

FOREIGN PATENT DOCUMENTS

| | | | | | |
|---|---|---|---|---|---|
| GB | | 2476149 A | * | 6/2011 | G01S 1/14 |
| WO | WO 2016/134193 A1 | | | 8/2016 | |

OTHER PUBLICATIONS

International Search Report and Written Opinion of the International Searching Authority, PCT/EP2019/065064, mailed Sep. 26, 2019, 9 pages.
Office Action for Chinese Patent Application No. 201980038518.5 mailed Sep. 27, 2023, 10 pages.

* cited by examiner

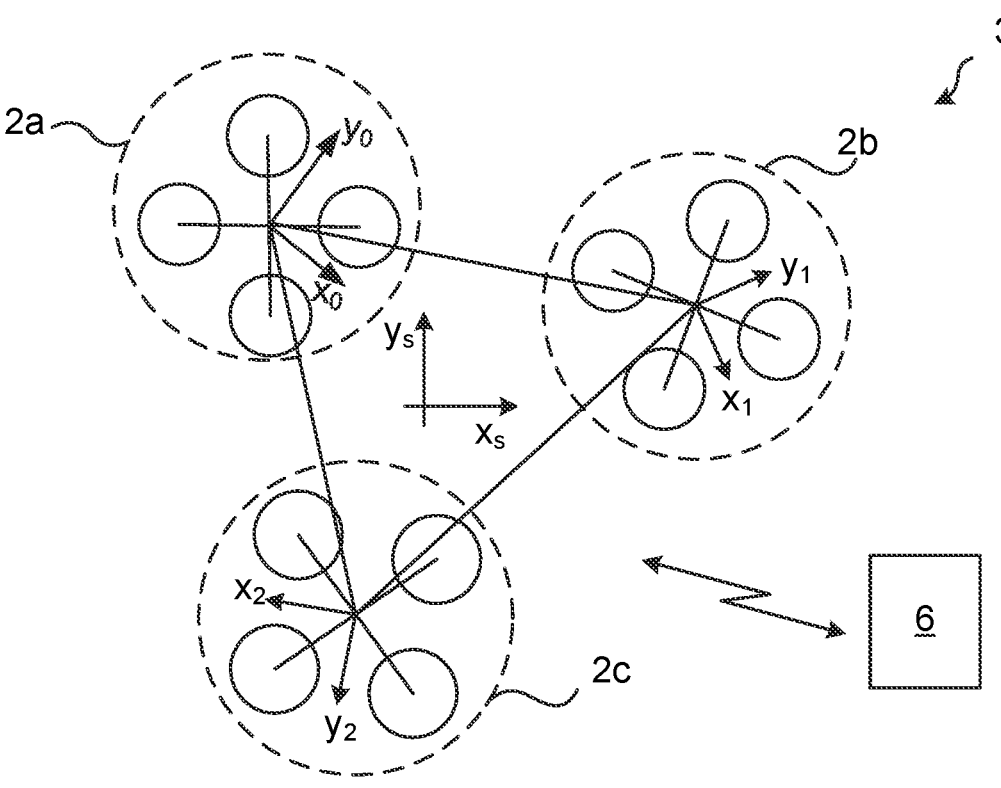
Fig. 1
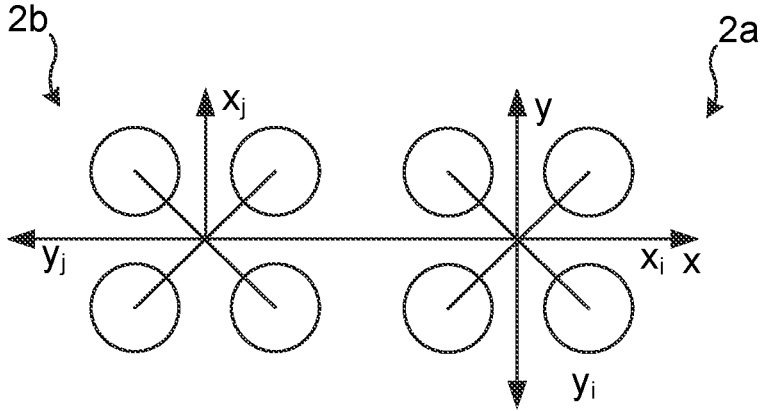
Fig. 2
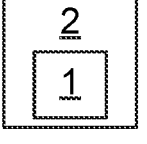 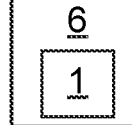 
Fig. 3A      Fig. 3B      Fig. 3C

DETERMINING CONTROL PARAMETERS FOR FORMATION OF MULTIPLE UAVs

CROSS REFERENCE TO RELATED APPLICATIONS

This application is a 35 U.S.C. § 371 national stage application of PCT International Application No. PCT/EP2019/065064 filed on Jun. 10, 2019, which in turns claims domestic priority to U.S. Provisional Patent Application No. 62/683,588, filed on Jun. 11, 2018, the disclosures and content of which are incorporated by reference herein in their entirety.

TECHNICAL FIELD

The invention relates to a method, a control device, a computer program and a computer program product for determining control parameters for controlling flight of a formation comprising at least two physically connected Unmanned Aerial Vehicles, UAVs.

BACKGROUND

UAVs, Unmanned Aerial Vehicles, have increased rapidly in popularity over the last decade. They are used in a wide range of applications such as structure inspection, agriculture, mapping and military purposes. However, the expansion of their applications is constrained by two main physical limitations: their low maximum payload and low maximum flight time. In fact, these two qualities are closely related to each other: if a UAV is used for load transportation, its flight time decreases considerably due to increased energy usage to carry the load.

One solution that has been proposed is aerial collaboration in which several UAVs are rigidly attached together in a formation to increase both the total maximum payload and flight time, due to the decreased weight of the total load transported by each UAV. In such a system, it is also envisioned that the UAVs may attach in a formation automatically without human intervention. However, this solution brings up several challenges. Even though each UAV is embedded with a control algorithm that lets it fly well alone, this control algorithm will not work when several UAVs are attached together, since the dynamics of the system completely change. Therefore, a formation of UAVs where each individual UAV controller is not adapted, would not be able to lift off from the ground more than some centimetres and would potentially crash. Hence, the control algorithm needs to be adapted according to the system dynamics given by each different formation configuration, which is a difficult problem to address. Moreover, the identification of the system dynamics and adaptation of the control algorithm should be done quickly and automatically without the need for human intervention.

In the prior art, it is assumed that the formation of UAVs is known a priori or it is estimated using an extremely precise, but very expensive and non-practical indoor positioning system (e.g. motion capture systems) that would fail in outdoor applications. Moreover, these indoor positioning systems also highly suffer from occlusions which decrease the system performance.

SUMMARY

It is an object to improve the determination of how to control a formation of UAVs.

According to a first aspect, it is provided a method for determining control parameters for controlling flight of a formation comprising at least two physically connected Unmanned Aerial Vehicles, UAVs. The method is performed in a controller device and comprising the steps of: determining UAVs forming part of the formation; controlling each one of the UAVs, in sequence, to perform a lift off procedure in which the UAV lifts off ground and lands on ground; acquiring, for each lift off procedure, inertial data from Inertial Measurement Units, IMUs, of each one of the UAVs of the formation; estimating UAV connection parameters for each possible pair of UAVs of the formation based on the inertial data, the UAV connection parameter comprising at least one of relative orientation, absolute orientations and distance between the UAVs of the pair; and determining control parameters for controlling flight of the formation based on the estimated connection parameters.

The method may further comprise the step of: estimating, for each UAV, absolute position and orientation relative to a coordinate frame of the formation, in which case the step of determining control parameters is based on the absolute position and orientation.

The method may further comprise the step of: filtering the acquired inertial data, yielding filtered inertial data, in which case the step of estimating UAV connection parameters is based on the filtered inertial data.

The step of filtering may comprise filtering to reduce bias.

The step of filtering may comprise filtering to reduce drifting errors.

The step of acquiring may comprise, for at least one of the UAVs, acquiring visual data from a visual sensor of the UAV, in which case the step of estimating UAV connection parameters is based on the visual data.

The step of filtering may be based on the visual data.

The step of acquiring may comprise acquiring visual data for all UAVs, respectively.

The method may further comprise the step of comparing visual features of the visual data with a map containing visual features and their positions.

The step of estimating UAV connection parameters may comprise estimating relative orientation based on estimations of individual attitude of each UAV derived from its acceleration and angular velocity data of the inertial data.

The step of estimating may comprise estimating a position of each UAV by double integrating acceleration, and wherein the distance between the UAVs of the pair is estimated based on the estimations of the individual attitude, estimations of position of each UAV of the UAVs of the pair, and an estimation of relative orientation between the UAVs of the pair.

The step of determining control parameters may be based on a pre-trained machine learning model.

All UAVs of the formation may form part of a single plane.

According to a second aspect, it is provided a controller device for determining control parameters for controlling flight of a formation comprising at least two physically connected Unmanned Aerial Vehicles, UAVs. The controller device comprises: a processor; and a memory storing instructions that, when executed by the processor, cause the controller device to: determine UAVs forming part of the formation; control each one of the UAVs, in sequence, to perform a lift off procedure in which the UAV lifts off ground and lands on ground; acquire, for each lift off procedure, inertial data from Inertial Measurement Units, IMUs, of each one of the UAVs of the formation; estimate UAV connection parameters for each possible pair of UAVs of the formation based on the inertial data, the UAV connection parameter comprising at least one of relative orientation, absolute orientations and distance between the UAVs of the pair; and determine control parameters for controlling flight of the formation based on the estimated connection parameters.

The controller device may further comprise instructions that, when executed by the processor, cause the controller device to: estimate, for each UAV, absolute position and orientation relative to a coordinate frame of the formation, in which case the instructions to determine control parameters comprise instructions that, when executed by the processor, cause the controller device to determine control parameters based on the absolute position and orientation.

The controller device may further comprise instructions that, when executed by the processor, cause the controller device to: filter the acquired inertial data, yielding filtered inertial data, in which case the instructions to estimate UAV connection parameters comprise instructions that, when executed by the processor, cause the controller device to estimate UAV connection parameters based on the filtered inertial data.

The instructions to filter may comprise instructions that, when executed by the processor, cause the controller device to filter to reduce bias.

The instructions to filter may comprise instructions that, when executed by the processor, cause the controller device to filter to reduce drifting errors.

The instructions to acquire may comprise instructions that, when executed by the processor, cause the controller device to acquire, for at least one of the UAVs, visual data from a visual sensor of the UAV. In this case, the estimating UAV connection parameters is based on the visual data.

The filtering may be based on the visual data.

The instructions to acquire may comprise instructions that, when executed by the processor, cause the controller device to acquire visual data for all UAVs, respectively.

The controller device may further comprise instructions that, when executed by the processor, cause the controller device to compare visual features of the visual data with a map containing visual features and their positions.

The instructions to estimate UAV connection parameters may comprise instructions that, when executed by the processor, cause the controller device to estimate relative orientation based on estimations of individual attitude of each UAV derived from its acceleration and angular velocity data of the inertial data.

The instructions to estimate may comprise instructions that, when executed by the processor, cause the controller device to estimate a position of each UAV by double integrating acceleration, and to estimate the distance between the UAVs of the pair based on the estimations of the individual attitude, estimations of position of each UAV of the UAVs of the pair, and an estimation of relative orientation between the UAVs of the pair.

The instructions to determine control parameters may comprise instructions that, when executed by the processor, cause the controller device to determine control parameters based on a pre-trained machine learning model.

All UAVs of the formation may form part of a single plane.

According to a third aspect, it is provided a controller device comprising: means for determining UAVs forming part of a formation comprising at least two physically connected Unmanned Aerial Vehicles UAVs; means for controlling each one of the UAVs, in sequence, to perform a lift off procedure in which the UAV lifts off ground and lands on ground; means for acquiring, for each lift off procedure, inertial data from Inertial Measurement Units, IMUs, of each one of the UAVs of the formation; means for estimating UAV connection parameters for each possible pair of UAVs of the formation based on the inertial data, the UAV connection parameter comprising at least one of relative orientation, absolute orientations and distance between the UAVs of the pair; and means for determining control parameters for controlling flight of the formation based on the estimated connection parameters.

According to a fourth aspect, it is provided a computer program for determining control parameters for controlling flight of a formation comprising at least two physically connected Unmanned Aerial Vehicles, UAVs. The computer program comprises computer program code which, when run on a controller device causes the controller device to: determine UAVs forming part of the formation; control each one of the UAVs, in sequence, to perform a lift off procedure in which the UAV lifts off ground and lands on ground; acquire, for each lift off procedure, inertial data from Inertial Measurement Units, IMUs, of each one of the UAVs of the formation; estimate UAV connection parameters for each possible pair of UAVs of the formation based on the inertial data, the UAV connection parameter comprising at least one of relative orientation, absolute orientations and distance between the UAVs of the pair; and determine control parameters for controlling flight of the formation based on the estimated connection parameters.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic diagram illustrating an environment in which embodiments presented herein can be applied for a formation of three UAVs;

FIG. 2 is a schematic diagram illustrating an environment in which embodiments presented herein can be applied for a formation of two UAVs;

FIGS. 3A-C are schematic diagrams illustrating embodiments of where a control device for determining control parameters for controlling flight of a formation of UAVs can be implemented;

DETAILED DESCRIPTION

Figures 4A, 4B:
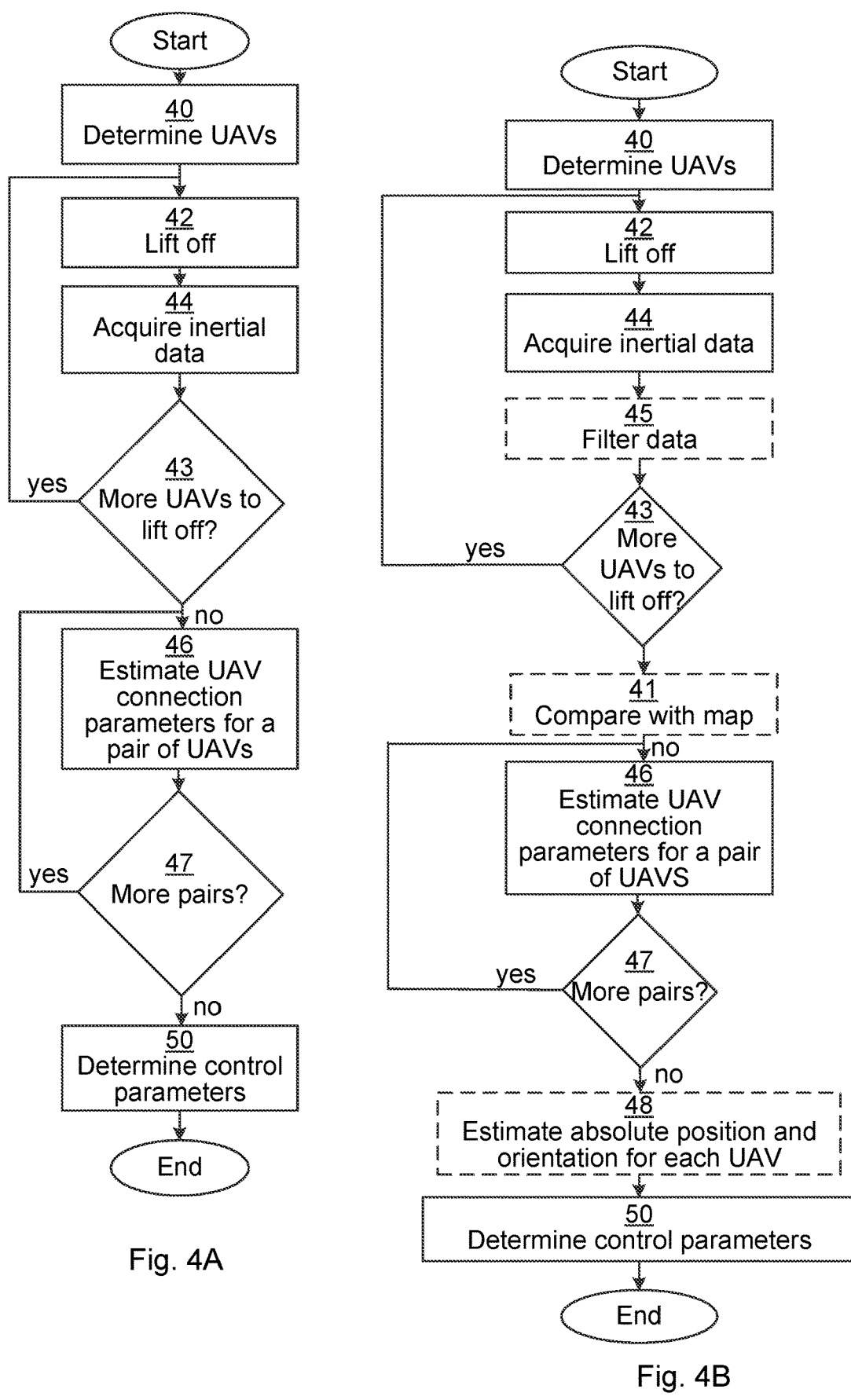
FIGS. 4A-B are flow charts illustrating methods for determining control parameters for controlling flight of a formation of UAVs.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein allows control parameters for a formation of UAVs to be determined in real-time in a quick manner to learn how the UAVs are connected, their positions and orientations, and automatically retune their control algorithms according to the estimated parameter. The learning only needs data captured from internal IMUs (inertial measurement units) of the UAVs.

In the proposed method, the newly attached UAVs individually perform a thrust action to lift off the UAV a short distance in the air, at which point IMU data for all UAVs of the formation is stored. This IMU data is used to estimate how the UAVs are connected, as well as their orientations and positions within the formation. Then, the controllers are adapted according to the identified parameters. The controller adaptation can be performed using an online reinforcement algorithm or using a pre-computed controller, based on machine learning, which maps the estimated parameters with suitable variables of the control algorithm. In comparison with the prior art, the proposed method does not require any external positioning system or a pre-defined formation of UAVs and is performed quickly when needed.

FIG. 1 is a schematic diagram illustrating an environment in which embodiments presented herein can be applied for a formation 3 of three UAVs 2*a*-*c*. The formation 3 comprises a first UAV 2*a*, a second UAV 2*b* and a third UAV 2*c*. Each UAV 2*a*-*c* can be of any suitable known or future type, e.g. quadcopter, etc. Each UAV comprises an IMU for capturing inertial data used for control of the UAV. The inertial data includes acceleration and angular velocity data. The inertial data of the UAVs, as explained in more detail below, is also used under specific circumstances to determine how to control flight of the entire formation 3. At least one of the UAVs 2*a*-*c* also comprises positioning module, e.g. based on GPS (Global Positioning System), Ultra-Wide Band module, camera-based positioning system, etc.

The formation 3 is formed by physically connecting the three UAVs 2*a*-*c*, e.g. using a rigid structure of e.g. metal and/or plastic connectors.

There is a first coordinate system $x_0$-$y_0$ for the first UAV 2*a*, a second coordinate system $x_1$-$y_1$ for the second UAV 2*b* and a third coordinate system $x_2$-$y_2$ for the third UAV $x_2$-$y_2$. The first, second and third coordinates systems are thus individual coordinate systems for each one of the UAVs.

Moreover, there is a coordinate system $x_s$-$y_s$ used for the entire formation 3.

An external computer 6 is in communication with the UAVs 2*a*-*c*. Communication between the UAVs 2*a*-*c* and/or between the UAVs 2*a*-*c* and the external computer 6 can occur using any suitable wireless interface, e.g. using any of the IEEE 802.11x standards (also known as WiFi), Bluetooth or Bluetooth Low Energy (BLE), ZigBee, and/or a cellular network. The cellular communication network can e.g. comply with any one or a combination of LTE (Long Term Evolution), next generation mobile networks (fifth generation, 5G), UMTS (Universal Mobile Telecommunications System) utilising W-CDMA (Wideband Code Division Multiplex), CDMA2000 (Code Division Multiple Access 2000), or any other current or future wireless network.

FIG. 2 is a schematic diagram illustrating a pair of UAVs 2*a*-2*b* used for calculations in accordance with the description below. A coordinate system $x_i$-$y_i$ is applied for the first UAV 2*a* of the pair and a coordinate system $x_j$-$y_j$ is applied for the second UAV 2*b* of the pair. A common coordinate system x-y is used for the whole pair.

The physical UAVs of the pair change when other pairs are evaluated, as described in more detail below.

FIGS. 3A-C are schematic diagrams illustrating embodiments of where a control device 1 can be implemented. The control device 1 is used for determining control parameters for controlling flight of a formation of UAVs.

In FIG. 3A, the control device 1 is shown as implemented in a UAV 2, e.g. being any one of the UAVs 2*a*-*c* of FIG. 1 or FIG. 2. The UAV 2 is thus the host device for the control device 1 in this implementation.

In FIG. 3B, the control device 1 is shown as implemented in the external computer 6. The external computer 6 is thus the host device for the control device 1 in this implementation.

In FIG. 3C, the control device 1 is shown as implemented as a stand-alone device. The control device 1 thus does not have a host device in this implementation.

FIGS. 4A-B are flow charts illustrating methods for determining control parameters for controlling flight of a formation of UAVs. The methods are performed in the control device 1 of FIG. 1 and FIG. 2. References are also made to FIG. 8, which is a schematic diagram illustrating the determination of control parameters in the control device of FIGS. 3A-C.

Figures 5, 6, 7, 8:
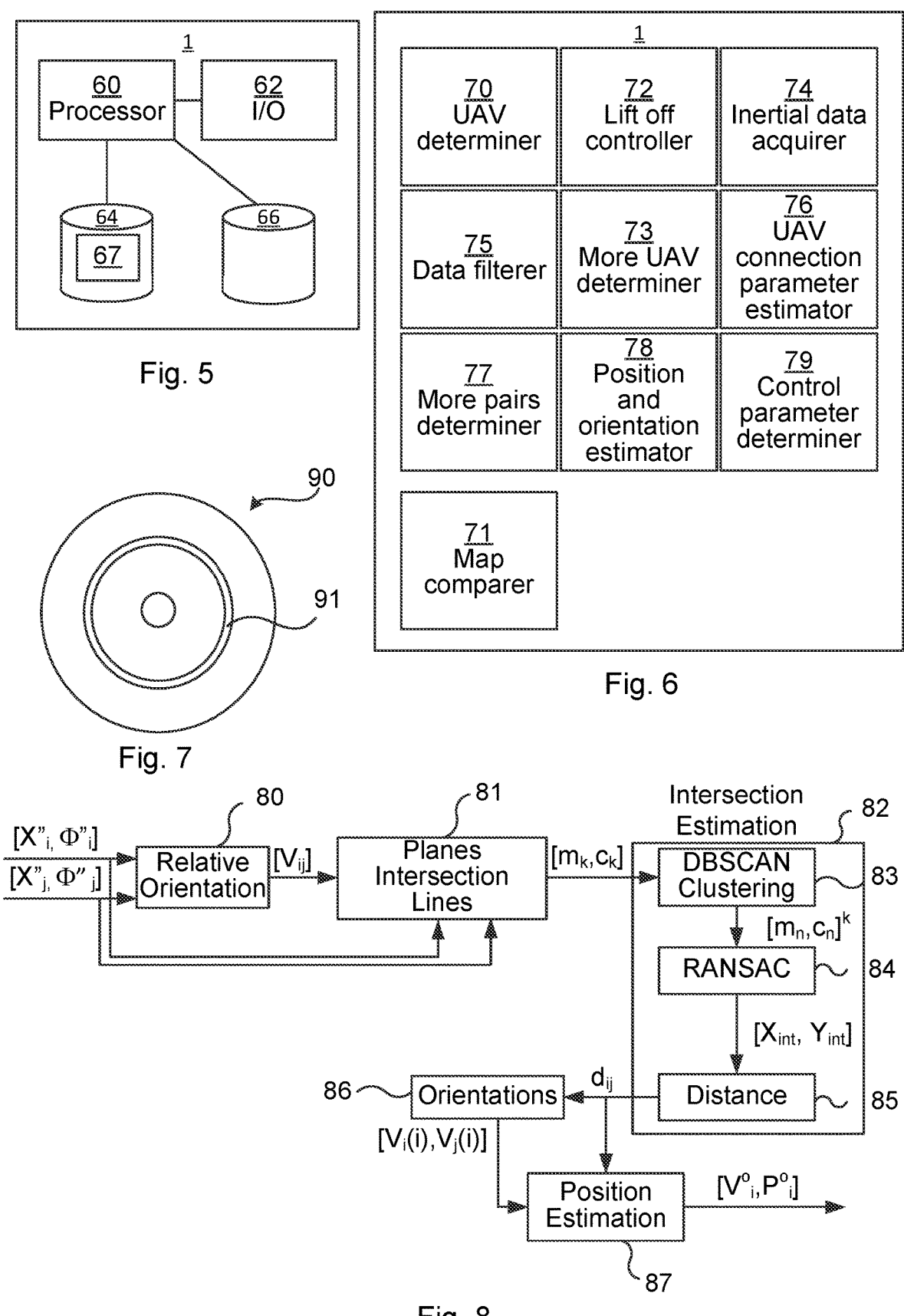
FIG. 5 is a schematic diagram illustrating components of the control device of FIGS. 3A-C according to one embodiment.
FIG. 6 is a schematic diagram showing functional modules of the control device of FIGS. 3A-C according to one embodiment.
FIG. 7 shows one example of a computer program product comprising computer readable means.
FIG. 8 is a schematic diagram illustrating the determination of control parameters in the control device of FIGS. 3A-C.

The parameters shown in FIG. 8 are as follows:

$X_i''$ is the individual position of UAV i, estimated using the IMU data (after filtering when this is applied). $X_j''$ is the corresponding parameter for UAV j.

$\Phi_i''$ is the individual attitude of UAV i, estimated using the IMU data (after filtering when this is applied). $\Phi_j''$ is the corresponding parameter for UAV j.

$V_{ij}$ is the relative orientation between the pair of UAVs i and j.

$m_k$ is the slope of the plane intersection line obtained with the data acquired in time step k.

$c_k$ is the intercept of the plane intersection line obtained with the data acquired in time step k. This line is obtained intersecting the z=0 plane and the plane defined by both UAVs in the pair after subtracting the position of one of the UAVs to itself and the other UAV.

$[m_n, c_n]^k$ represent all the n pairs of intercept of slopes that have been clustered, and as a consequence, not discarded as outliers.

$[x_{int}, y_{int}]$ is the estimated intersection point of all these clustered lines.

$d_{ij}$ is the distance between the pair of UAVs.

$[V_i(i), V_j(i)]$ are the orientations of each UAV i and j in the pair. The (i) means that both UAVs has been virtually situated with the line that connects them both parallel to the x axis of the coordinate frame (as in FIG. 2) and UAV i has been situated in the origin of the coordinate frame. This is done, as described in more detail below, to be able to reconstruct all the positions and orientations.

$[V_i^o, V_j^o]$ are the orientations of UAV i and j in the system's coordinate frame. In this figure, it makes more sense to use $V_i^o$ as this step is not longer done in pairs, but for each UAV.

$P_i^o$ is the position of the UAV i in the system's coordinate frame. $P_j^o$ is the corresponding parameter for UAV j.

The formation comprises at least two physically connected UAVs, e.g. as illustrated in FIG. 1 and FIG. 2. All UAVs of the formation can form part of a single plane to simplify calculations. The method is run whenever a new UAV formation is established and the number of UAVs in the formation is larger than one. In one embodiment, the method is triggered by a user who assembles the UAVs in a formation and initiates this method. For example, the user may press a button on one of the UAVs in the formation, or the user may trigger the method in an application in a smartphone.

In another embodiment, the method is triggered automatically. For example, the UAV can detect when a connector is attached to it, where the attachment of a connector can be detected using a passive or active connection sensor. If the addition of a new connection in one of the UAVs is detected, said UAV triggers a creation of a new UAV formation by communicating with neighboring UAVs, whereby the method is started.

In one embodiment, the method is triggered after the formation is in flight. The control parameters that are already being used by the UAVs may be suboptimal and do not provide sufficient performance. The formation could then be landed and this method is performed. In one embodiment, the method is even performed when the formation is in the air. Detection that the performance is not sufficient, can be given by a performance function applied on the motion dynamics of the UAV, given a desired tracking trajectory (e.g. static error on tracking a desired trajectory larger than a threshold, tracking overshoot larger than a threshold, rise time during tracking larger than a threshold, oscillation frequency and magnitude larger than a threshold, etc.).

In a determine UAVs step 40 of FIG. 4A, the control device determines the UAVs forming part of the formation. In one embodiment, when a new connection is established, the UAVs trigger a broadcast of a message. In this way, a UAV first detects the attachment of a connection (or a user presses a button in the UAV whenever a new connection is attached), and then triggers a message, comprising an identifier of the UAV, and receives a message from the neighbour to which it has been connected, where the message from the neighbour comprises an identifier of the neighbouring UAV. In this way, whenever a new connection is established, the UAVs can readily identify to whom they became connected. Then, the rest of the method is only executed for the UAVs which are part of the formation.

In one embodiment, the number of UAVs that need to be attached in the formation is calculated by the external computer to which the UAVs are connected. This number would be calculated depending on the task that they may need to perform. For instance, if the UAVs are used for load transportation inside a warehouse, the number of UAVs would be determined by the weight and morphology of the package. Then the external computer would choose how many and which UAVs will be attached. Such scenario can also be implemented in a distributed manner without an external computer, where the role described for the external computer for calculating the number of UAVs could be performed by one of the UAVs assuming that task. The selected UAVs may then attach by themselves without an external user help, or a user may simply attach them.

In a lift off step 42, the control device controls one of the UAVs to perform a lift off procedure in which the UAV in question lifts off ground and lands on ground. The objective of this step is to create movement to allow enough useful data to be gathered (in the next step) in the IMUs. In order to lift a UAV, a thrust in one or more of the UAV motors of one UAV can be set for T milliseconds after which the thrust can be set to 0. The time T depends on the height X that is to be achieved.

In an acquire inertial data step 44, the control device acquires inertial data from Inertial Measurement Units, IMUs, of each one of the UAVs of the formation. In other words, the inertial data is acquired from all UAVs. The inertial data can e.g. be acquired at a constant rate of 500 Hz as soon as the lift off is initiated. As explained in more detail below, the measurements can be used to estimate the individual state (position, velocities, angular velocities and attitude) of each UAV. This step is performed concurrently with the lift off step 42.

Optionally, this step comprises acquiring visual data from a visual sensor of the UAV. The visual data can be acquired for one of the UAVs, some of the UAVs or all of the UAVs. When it is sufficient that visual data is acquired for only one of the UAVs, only that UAV needs to comprise a visual sensor (e.g. camera) and the other UAVs can be of a simpler and cheaper configuration without any visual sensor.

In one embodiment, when there are multiple visual sensors, the thrust is applied in step 42 in a way so that the whole UAV formation moves to a state where all visual sensors can capture features, which may require moving the formation several centimetres away from the original position.

When using visual sensors, the existence and the quality of captured visual features in the visual data affects the performance of the pose estimation. Hence, the motion in step 42 may need to be controlled in real-time until visual data with visual features of sufficient distinguishability is captured. In this way, when clear visual features are easily captured, less motion is needed and more motion is only added when needed for capturing clear visual features.

In a conditional more UAVs to lift off step 43, the control device determines if there are any more UAVs of the formation which have not been controlled to perform a lift off. If this is the case, the method returns to the lift off step 42. Otherwise, the method continues to an estimate UAV connection parameters for a pair of UAVs step 46.

Using this loop, the lift off is performed in step 42 for each one of the UAVs, in sequence. Moreover, the inertial data is acquired in step 44 for each lift off procedure. A schedule can be used to establish the time at which each UAV initiates the lift off.

Optionally, the applied thrust could be small initially, and the IMU data is used to determine if the thrust was sufficient, after which the thrust could be increased if needed to achieve the lift off. When performing the lifting, the amount of thrust applied to the propellers is then small enough not to damage the formation, for instance, excessive thrust could even flip over the formation. In other words, such a lift off scheme can prevent giving an excessive thrust which could cause harm, since the structure of the formation is not yet known.

In the estimate UAV connection parameters for a pair of UAVs step 46, the control device estimates UAV connection parameters for one pair of UAVs of the formation based on the inertial data. The UAV connection parameters comprise at least one of relative orientation, absolute orientations and distance between the UAVs of the pair. In one embodiment, the UAV connection parameters comprise all of relative orientation, absolute orientations and distance between the UAVs of the pair.

Optionally, the relative orientation is estimated based on estimations of individual attitude of each UAV derived from its acceleration and angular velocity data of the inertial data, see block 80 of FIG. 8

Optionally, a position of each UAV is estimated by double integrating acceleration. The distance between the UAVs of the pair is then estimated based on the estimations of the individual attitude, estimations of position of each UAV of the UAVs of the pair, and an estimation of relative orientation between the UAVs of the pair.

In one embodiment, the relative orientation between each pair of UAVs is estimated using the stored estimations of the individual attitude of each UAV derived from the IMUs' acceleration and angular velocities data. As the attachment between UAVs is rigid, the estimated individual attitude in each UAV would be the same if the UAVs' coordinate frames were aligned. As a consequence, it is calculated how much one of the UAVs of the pair would need to be rotated around the z-axis to get the same attitude estimations as the other UAV in the pair, being this angle the relative orientation between both UAVs in the pair. This relative orientation is calculated for each time step of the stored data and later averaged.

In one embodiment, the distance between each pair of UAVs is estimated using the estimations of the individual attitude and position of each UAV derived from the acceleration and angular velocities (from the inertial data data), along with the estimated relative orientation between the UAVs of the pair calculated as described above. This is represented in block 81 of FIG. 8. The sequential procedures implemented for this method are:

1a. Using the relative orientation, the coordinate frame of one UAV within the pair is rotated so that both of their coordinate frames are aligned. For the rest of the procedure, the UAV whose coordinate frame has not been rotated is considered to be situated in the center of the world coordinate frame, both set of axes aligned.

1b. For each time period in the stored data, the position of this rotated UAV is subtracted to the position of both UAVs 1c. The plane defined by the UAV with rotated coordinate frame is calculated for each time period. Later, the intersection lines between this set of planes and the plane z=0 is obtained. The distance between the intersection point of this set of lines and the origin is the distance between both UAVs.

In one embodiment, when there is not a unique intersection point due to residual noise in the measurements, the intersection point mentioned in point 1c above is calculated by applying a line fitting algorithm to this set of lines after discarding possible outliers using a clustering algorithm, illustrated in block 82 of FIG. 8. To estimate this intersection point given noisy measurements, and consequently the distance between the pair of UAVs, the following procedure is applied:

2a. For each line, the intercept and slope are calculated. The obtained pairs of intercepts and slopes are clustered and the unclassified pairs are discarded as they are considered outliers. A DBSCAN (Density-based Spatial Clustering of Applications with Noise) algorithm could be used for this purpose, illustrated by block 83 of FIG. 8.

2b. To discard any possible residual outliers, a line is fitted over the pairs of intercepts and slopes in the intercept-slope space. The positive intercept and negative slope values of this fitted line define the intersection point, which is used to calculate the distance between the pairs of UAVs. As an example, RANSAC (Random Sample Consensus) algorithm could be applied for this purpose, illustrated by block 84 of FIG. 8.

In one embodiment, the estimated intersection point is used to estimate the distance between both UAVs in the pair, illustrated by block 85 of FIG. 8. The distance is estimated by calculating the distance between the intersection point and the origin of the coordinate frame.

In one embodiment, the orientation of the UAVs in each pair is estimated using the intersection point estimated according to above, using the angle between the vector defined by this point and the origin and the negative x-axis and the relative orientation calculated previously. The coordinate frame of each pair of UAVs is considered to have the x-axis aligned with a virtual line between the pair of UAVs. The z-axes are all aligned, and the UAV that was virtually rotated in the first embodiment is situated in the origin of this coordinated frame, as shown in FIG. 2. Using the estimated intersection point and the relative orientation between both UAVs, the orientation of each UAV within this coordinate frame is estimated. The orientation of the UAV situated in the positive x-axis is considered to be the angle between the vector defined by the intersection point calculated in according to above and the origin and the negative x axis. The orientation of the other UAV in the pair is obtained using the relative angle calculated previously.

When visual data was acquired in step 44, the UAV connection parameters are also based on the visual data. The visual data can be used directly in this step, or the visual data can be used in an intermediate filter data step 45 (see below).

In one embodiment, the visual sensor is used to track visual features of the environment and is able to directly extract the motion properties (acceleration, linear and angular velocity, translation and rotation) of the UAV, which is computed with regard to those features. For an even more accurate and robust estimation of the motion, the visual sensor information is combined with inertial information, e.g. using a VIO algorithm as explained below.

By combining the visual sensor and the inertial data, the motion properties of the UAVs can be extracted in a more robust and precise manner.

In a conditional more pairs step 47, the control device determines if step 46 has been performed for all possible pairs of UAVs of the formation. If there are more pairs in the formation for which 46 has not been performed, the method returns to the estimate UAV connection parameters for a pair of UAVs step 46 to process such a pair. Otherwise, the method proceeds to a determine control parameter step 50.

Hence, step 46 is iterated for each pair of UAVs connected to the formation of attached UAVs to estimate every per pair distance and orientation, to thereby completely define the formation and be able to estimate the absolute positions (illustrated in block 87 of FIG. 8) and orientations (illustrated by block 86 of FIG. 8) within the formation's coordinate frame.

In the determine control parameters step 50, the control device determines control parameters for controlling flight of the formation based on the estimated connection parameters.

In one embodiment, a transformation block is implemented between the output of the controller algorithm and the voltage input of each motor of each UAV, to adapt this output to the different orientations of the formation by rotating this output using the estimated value of the orientation of the current UAV.

In the controllers for the UAV, the output can be the values of momentum to be applied in each axis (denoted as r, p, y) and the thrust (T) to be applied to obtained a desired height. These values are transformed to the input to supplied to the UAV. For instance, the UAV input can be voltages to be applied in each motor to obtain the desired momentums and minimum thrust. As an example, for the most simple case, the formula would be:

$$\text{Voltage\_motor\_}i=\text{Thrust}+ar+bp+cy$$

where a, b and c can take values of −1 and 1. The parameters a and b depend on the position of the motor i. The parameter c depends on the spinning direction of the motor. For instance, if motor i is situated in the positive x, and we need a positive value of p (momentum around the y-axis), then as an applied thrust in this motor would have a negative effect in the torque, the value of b is chosen as −1.

What happens here is that the vector [r, p, y] is rotated using the estimated orientation. Therefore, once these values of [r, p, y] are rotated, yielding [r, p, y]', these new values are transformed to the input format we could need.

Independently of the number of UAVs, the process would be:

1. Estimate new values of T, r, p, y (by the controller)
2. Rotate [r, p, y] an angle α estimated in the estimation step: $R_z(\alpha) \cdot [r, p, y] = [r, p, y]'$
3. Transform the values of T and [r, p, y]' to the specific input that we need (in our case, voltages)

An objective of the controller is to estimate the voltage that need to be applied in each motor to get the desired behaviour in the formation. This transformation block adapts the output of the controller, to the estimated orientation of each UAV in the formation.

In one embodiment, the control parameters are based on a pre-trained machine learning model. The parameters of the controller are adapted to the different configurations of the formation. First, controller parameters for different sets of two UAVs (N different distances) are tuned using reinforcement learning. This tuning step is done in advance in simulation. These parameters, along with the associated distances, are used to train a neural network, in a type of machine learning. The neural network is used as an interpolation function that will allow the formation to directly estimate the controller parameters from the estimated positions of each UAV. The estimated positions can be expressed as distances from each quadcopter to each axis X, Y and Z of the coordinate frame of the formation. This interpolation step is done online right after the physical parameters of the formation are estimated.

In one embodiment, instead of the machine learning approach, a classic adaptive control approach is employed, where a controller is designed which maps an estimated distance parameter to a controller gain. Such map function may be a continuous or discontinuous and linear or nonlinear function with respect to the distance parameter. Such approaches are commonly known in the control literature as adaptive controllers, switching controllers, gain-scheduling or parameter-dependent controllers.

Looking now to FIG. 4B, only new or modified steps compared to the steps of FIG. 4A will be described.

In an optional filter data step 45, the control device filters the acquired inertial data, yielding filtered inertial data.

The IMUs measurements are typically noisy. The filtering increases the quality of the obtained measurements. To estimate the physical parameters of the formation of attached UAVs, the real time individual positions and orientations of each UAV is estimated relative to their own coordinate frame. However, when performing this using the raw measurements from the currently available IMUs, the error in this real time estimation drifts considerably.

The filtering can include any one or more of several types of filtering.

A first type of filtering can be performed to reduce bias. In the initialization, the IMUs measurements, accelerations and angular velocities are stored for M time steps and their averages are calculated. These averages are then subtracted to each new measurement in the IMUs once the acquire inertial data step 44 is performed started. In this way, the bias in the measurements is reduced.

A second type of filtering can be performed to reduce drifting errors. The individual position of the UAV is estimated from the accelerometers measurements by integrating them twice. This produces a fast increment of the drift of the position estimation. To reduce any position estimation drift, a variance-based method can be used. The variance of the measured acceleration in the last N time steps is measured. If this variance is higher than a threshold, this implies that the formation is moving, otherwise, the formation is considered to be static. This reduce any drift error.

A third type of filtering can be performed by cleaning the acquired data by considering only the measurements acquired in the time steps between each lift off start and the moment in which the UAVs reaches its highest height. The rest of the data is then discarded. In between lift offs, the filters that are used to estimate the individual state of each UAV are restarted to reset the error drift before each lift off.

This filtering is done in real time. Once a new measurement (acceleration and angular velocities) has been filtered, the individual state of the UAV is estimated (position, velocities, angular velocities and attitude) and stored. Depending on the capabilities of the chosen UAV, this data can be stored in the UAV or sent to the external computer.

When visual data is available, this is optionally considered in the filter data step 45. The visual data can be used to reduce bias and to reduce drifting. This is achieved by the visual sensor tracking visual features, and utilising the relative motion with respect to the visual features, whereby bias and drifting errors from the IMU is reduced.

In one embodiment, the inertial data is filtered using real-time visual features extracted from a video feed from an onboard camera on one or more of the UAVs. The estimation in step 46 is based on the individual position and orientation estimations of the UAVs. Both of these parameters can be improved by using the visual data along with the inertial information, e.g. using Visual Inertial Odometry (VIO), which includes filtering of both the visual data and inertial data. By using a VIO algorithm, the drift determination in the individual position and orientation estimation increases considerably, allowing more precise physical parameters estimation. The estimation of these physical parameters is then computed in step 46.

When step 45 is performed, the estimating UAV connection parameters in step 46 is based on the filtered inertial data.

In an optional compare with map step 41, the control device compares visual features of the visual data with a map containing visual features and their positions.

In one embodiment, the map containing visual features is extracted from previous flight attempts in the same area.

Using the map, it is possible to find the relative position and orientation of the UAVs when features of the map are identified. This map can e.g. be created using simultaneous localization and mapping (SLAM).

If no visual features of the map can be found in the visual data, the map can be continued to be built using SLAM when the thrust is applied to the UAVs in step 40. Alternatively or additionally, when no visual features of the map can be found in the visual data, the UAVs are moved (lifted up/rotated) until visual features of the map are found in the visual data.

In an optional estimate absolute position and orientation for each UAV step 48, the control device estimates, for each UAV, absolute position and orientation relative to a coordinate frame of the formation.

In another embodiment, the absolute position and orientation are estimated given the estimated distances and orientation of each pair of UAVs. The formation is then perfectly defined.

When step 48 is performed, the control parameters are determined, in step 50, based on the absolute position and orientation.

The methods presented herein can also be used to determine size of a formation.

The embodiments presented herein allow for UAVs to be attached in a formation and be controlled to perform an autonomous cooperative flight, for example for an aerial transportation application. The positions and orientations of the UAVs within the formation do not need to be known a priori or be predefined. Moreover, the method only needs data from the IMUs already present in the UAVs, and does not require any additional localization system or hardware (e.g. GPS, indoor positioning system, etc.)

This estimation is performed in an online and fast manner, and it can be performed immediately before a flight attempt. Once these parameters are estimated, the proposed solution automatically adapts the control algorithms to the new estimated formation.

FIG. 5 is a schematic diagram illustrating components of the control device of FIGS. 3A-C according to one embodiment. It is to be noted that one or more of the mentioned components can be shared with a host device, when applicable. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 4A-B above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The control device 1 further comprises an I/O interface 62 for communicating with external and/or internal entities.

Other components of the control device 1 are omitted in order not to obscure the concepts presented herein.

FIG. 6 is a schematic diagram showing functional modules of the control device of FIGS. 3A-C according to one embodiment. The modules are implemented using software instructions such as a computer program executing in the control device 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-B.

A UAV determiner 70 corresponds to step 40. A lift off controller 72 corresponds to step 42. An inertial data acquirer 74 corresponds to step 44. A data filterer 75 corresponds to step 45. A more UAV determiner 73 corresponds to step 43. A UAV connection parameter estimator 76 corresponds to step 46. A more pairs determiner 77 corresponds to step 47. A position and orientation estimator 78 corresponds to step 48. A control parameter determiner 79 corresponds to step 50. A map comparer 71 corresponds to step 41.

FIG. 7 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling flight of a formation comprising at least two Unmanned Aerial Vehicles, UAVs, physically connected to each other, the method being performed in a controller device and comprising:

determining UAVs located on ground, wherein the UAVs are rigidly connected to each other with a fixed distance between each other, when forming part of, and maintaining a formation;

controlling each one of the UAVs to perform a respective lift off procedure in sequence, while maintaining the formation and the fixed distance between each other, each lift off procedure comprising that a respective UAV lifts off ground after which it lands on ground all while the other one or more UAVs remain on the ground during each lift off procedure;

acquiring, concurrently with each lift off procedure, when a respective UAV lifts off ground, inertial data from Inertial Measurement Units, IMUs, of each one of the UAVs of the formation;

estimating UAV connection parameters for each possible pair of UAVs of the formation based on the inertial data, acquired concurrently with each lift off procedure, the UAV connection parameter comprising at least one of relative orientation, absolute orientations and distance between the UAVs of the pair; and controlling flight of each UAV of the formation, based on the connection parameters, estimated during the lift off procedures, while maintaining the formation.

2. The method according to claim 1, further comprising: filtering the acquired inertial data, yielding filtered inertial data;

and wherein the UAV connection parameters are estimated based on the filtered inertial data.

3. The method according to claim 2, wherein the filtering comprises filtering to reduce bias.

4. The method according to claim 2, wherein the filtering comprises filtering to reduce drifting errors.

5. The method according to claim 1, wherein the acquiring comprises, for at least one of the UAVs, acquiring visual data from a visual sensor of the UAV, and wherein the AV connection parameters are estimated based on the visual data.

6. The method according to claim 5, wherein the filtering is based on the visual data.

7. The method according to claim 5, wherein the acquiring comprises acquiring visual data for all UAVs, respectively.

8. The method according to claim 5, further comprising comparing visual features of the visual data with a map containing visual features and their positions.

9. The method according to claim 1, wherein the estimating of UAV connection parameters comprises estimating relative orientation based on estimations of individual attitude of each UAV derived from its acceleration and angular velocity data of the inertial data.

10. The method according to claim 9, wherein the estimating comprises estimating a position of each UAV by double integrating acceleration, and wherein the distance between the UAVs of the pair is estimated based on the estimations of the individual attitude, estimations of position of each UAV of the UAVs of the pair, and an estimation of relative orientation between the UAVs of the pair.

11. The method according to claim 1, wherein all UAVs of the formation form part of a single plane.

12. A controller device for controlling flight of a formation comprising at least two Unmanned Aerial Vehicles, UAVs, physically connected to each other, the controller device comprising:

a processor; and a memory storing instructions that, when executed by the processor, cause the controller device to:

determine UAVs located on ground, wherein the UAVs are rigidly connected to each other with a fixed distance between each other, when forming part of, and maintaining a formation;

control each one of the UAV to perform a respective lift off procedure in sequence, while maintaining the formation and the fixed distance between each other, each lift off procedure comprising that a respective UAV lifts off ground after which it lands on ground all while the other one or more UAVs remain on ground during each lift off procedure;

acquire, concurrently with each lift off procedure, when a respective UAV lifts off ground, inertial data from Inertial Measurement Units, IMUs, of each one of the UAVs of the formation;

estimate UAV connection parameters for each possible pair of UAVs of the formation based on the inertial data, acquired concurrently with each lift off procedure, the UAV connection parameter comprising at least one of relative orientation, absolute orientations and distance between the UAVs of the pair; and control flight of each UAV of the formation, based on the connection parameters, estimated during the lift off procedures, while maintaining the formation.

13. The controller device according to claim 12, further comprising instructions that, when executed by the processor, cause the controller device to:

filter the acquired inertial data, yielding filtered inertial data;

and wherein the instructions to estimate UAV connection parameters comprise instructions that, when executed by the processor, cause the controller device to estimate UAV connection parameters based on the filtered inertial data.

14. The controller device according to claim 13, wherein the instructions to filter comprise instructions that, when executed by the processor, cause the controller device to filter to reduce bias.

15. The controller device according to claim 13, wherein the instructions to filter comprise instructions that, when executed by the processor, cause the controller device to filter to reduce drifting errors.

16. The controller device according to claim 12, wherein the instructions to acquire comprise instructions that, when executed by the processor, cause the controller device to acquire, for at least one of the UAVs, visual data from a visual sensor of the UAV, and wherein the estimating UAV connection parameters is based on the visual data.

17. The controller device according to claim 16, wherein the filtering is based on the visual data.

18. The controller device according to claim 16, wherein the instructions to acquire comprise instructions that, when executed by the processor, cause the controller device to acquire visual data for all UAVs, respectively.

19. The controller device according to claim 16, further comprising instructions that, when executed by the processor, cause the controller device to compare visual features of the visual data with a map containing visual features and their positions.

20. The controller device according to claim 12, wherein the instructions to estimate UAV connection parameters comprise instructions that, when executed by the processor, cause the controller device to estimate relative orientation based on estimations of individual attitude of each UAV derived from its acceleration and angular velocity data of the inertial data.

21. The controller device according to claim 20, wherein the instructions to estimate comprise instructions that, when executed by the processor, cause the controller device to estimate a position of each UAV by double integrating acceleration, and to estimate the distance between the UAVs of the pair based on the estimations of the individual attitude, estimations of position of each UAV of the UAVs of the pair, and an estimation of relative orientation between the UAVs of the pair.

22. The controller device according to claim 12, wherein all UAVs of the formation form part of a single plane.

23. A computer program for controlling flight of a formation comprising at least two Unmanned Aerial Vehicles, UAVs, physically connected to each other, the computer program comprising computer program code which, when run on a controller device causes the controller device to:

determine UAVs located on ground, wherein the UAVs are rigidly connected to each other with a fixed distance between each other, when forming part of, and maintaining a formation;

control each one of the UAV to perform a respective lift off procedure in sequence, while maintaining the formation and the fixed distance between each other, each lift off procedure comprising that a respective UAV lifts off ground after which it lands on ground all while the other one or more UAVs remain on the ground during each lift off procedure;

acquire, concurrently with each lift off procedure, when a respective UAV lifts off ground, inertial data from Inertial Measurement Units, IMUs, of each one of the UAVs of the formation;

estimate UAV connection parameters for each possible pair of UAVs of the formation based on the inertial data, acquired concurrently with each lift off procedure, the UAV connection parameter comprising at least one of relative orientation, absolute orientations and distance between the UAVs of the pair; and control flight of each UAV of the formation based on the connection parameters, estimated during the lift off procedures, while maintaining the formation.

24. A computer program product comprising a computer program according to claim 23 and a computer readable means on which the computer program is stored.

* * * * *